United States Patent
Dube et al.

(10) Patent No.: US 8,082,790 B2
(45) Date of Patent: Dec. 27, 2011

(54) SOLID-STATE INERTIAL SENSOR ON CHIP

(75) Inventors: Gaston Dube, Sainte-Anne-des-Monts (CA); Alfredo Riviere, New York, NY (US)

(73) Assignee: Sural C.A., Caracas (VE)

( * ) Notice: Subject to any disclaimer, the term of this patent is extended or adjusted under 35 U.S.C. 154(b) by 506 days.

(21) Appl. No.: 12/365,535

(22) Filed: Feb. 4, 2009

(65) Prior Publication Data
US 2010/0037692 A1 Feb. 18, 2010

Related U.S. Application Data

(60) Provisional application No. 61/089,170, filed on Aug. 15, 2008.

(51) Int. Cl.
*G01C 19/56* (2006.01)
*G01P 15/10* (2006.01)
(52) U.S. Cl. ............... 73/504.15; 73/514.29; 73/510
(58) Field of Classification Search ............. 73/504.15, 73/504.16, 510, 514.29
See application file for complete search history.

(56) References Cited

U.S. PATENT DOCUMENTS

| | | | |
|---|---|---|---|
| 4,538,461 A * | 9/1985 | Juptner et al. | 73/504.16 |
| 4,658,175 A | 4/1987 | Albert | |
| 4,939,935 A | 7/1990 | Amand | |
| 6,414,416 B1 | 7/2002 | Janiaud et al. | |
| 6,546,800 B1 | 4/2003 | Namerikawa et al. | |
| 6,595,054 B2 | 7/2003 | Paros et al. | |
| 6,662,658 B2 | 12/2003 | Foote | |
| 6,675,651 B2 | 1/2004 | Yanagisawa et al. | |
| 6,698,292 B2 | 3/2004 | Kikuchi | |
| 7,126,262 B2 | 10/2006 | Kawauchi et al. | |
| 2004/0221651 A1 | 11/2004 | Schiller | |

OTHER PUBLICATIONS

O. Bel et al., "Two axes quartz angular rate sensor," Proc. 2002 IEEE Int. Freq. Ctrl. Symp, pp. 214-219.
International Search Report of PCT/US09/33075; Mailed on Jul. 16, 2009.
Written Opinion of PCT/US09/33075; Mailed on Jul. 16, 2009.

* cited by examiner

*Primary Examiner* — John Chapman, Jr.
(74) *Attorney, Agent, or Firm* — Choate Hall & Stewart LLP

(57) ABSTRACT

Monolithic solid-state inertial sensor. The sensor detects rotation rate about three orthogonal axes and includes a micromachined monolithic piezoelectric crystalline structure including an equal number of vibratory drive and detection tines on each side of an axis of symmetry of the sensor, the tines being synchronized to have alternate actuation movements inward and outward.

24 Claims, 12 Drawing Sheets

| # | Drive force direction | Detection Tines Movement | Detection Electrodes charges | |
|---|---|---|---|---|
| Rotation around Y | | | | (U-Upper, L-Lower, L-Left, R-Right) |
| 1 | ← | UP | UL UR: + / − , − / + : LL LR | |
| 2 | ← | UP | UL UR: − / + , + / − : LL LR | |
| 3 | → | DOWN | UL UR: − / + , + / − : LL LR | |
| 4 | → | DOWN | UL UR: + / − , − / + : LL LR | |
| Rotation around X | | | | |
| 1 | ← | UP | UL UR: + / − , − / + : LL LR | |
| 2 | ← | DOWN | UL UR: + / − , − / + : LL LR | |
| 3 | → | UP | UL UR: + / − , − / + : LL LR | |
| 4 | → | DOWN | UL UR: + / − , − / + : LL LR | |
| Rotation around Z | | | | |
| 1 | ↙ | LEFT | UL UR: + / − , + / − : LL LR | |
| 2 | ↖ | RIGHT | UL UR: − / + , − / + : LL LR | |
| 3 | ↘ | LEFT | UL UR: + / − , + / − : LL LR | |
| 4 | ↗ | RIGHT | UL UR: − / + , − / + : LL LR | |
| 5 & 6 | NA | LEFT | UL UR: + / − , + / − : LL LR | |

FIG. 10

SOLID-STATE INERTIAL SENSOR ON CHIP

This application claims priority to U.S. provisional application Ser. No. 61/089,170 filed on Aug. 15, 2008, the contents of which are incorporated herein by reference.

BACKGROUND OF THE INVENTION

This invention relates to a solid state sensor element that combines gyroscopic sensor function on three orthogonal axes with accelerometer function on three orthogonal axes, and more particularly to an inertial sensor using vibrating and torsion beams of a piezoelectric material.

Inertial sensors are used in various applications where progression of the movements, either linear or rotary, is not referred to an external coordinate system. These movements can be measured by gyroscopes and accelerometers. In the past, such inertial sensors were used almost exclusively in navigation systems. In recent years, there has been a growing interest in industrial applications of inertial systems in robotic, automotive and, more generally, in the consumer market for consumer electronics such as cell phones, digital cameras and portable GPS systems. Such inertial sensors represent an important component of future human-machine interfaces as a lot of inertial information can be retrieved from an acceleration measurement by single and double mathematical integrations to obtain the change in speed and position. With the rapid evolution of electronic components integration, such inertial sensors are becoming smaller and cheaper but many technology compromises are required to limit their costs. Nowadays, the physical dimensions of a three axis gyroscopic solution remain large.

For more than 10 years now, the usage of micro-vibrating resonator elements, as illustrated in FIG. 1, which generate out-of-plane vibration when rotated around a sensitive axis is well established for various inertial applications in these markets, namely for inertial measurement units, inertial navigation or attitude and heading control systems. Similarly, many examples of accelerometers using vibrating elements are known from the prior art. For these inertial sensors, various types of materials can be used which are related to the type of excitation selected. If an external mode of vibration is selected, a non-piezoelectric material is normally used for the sensor element and the drive vibration is mostly generated by electrostatic means. It is known that such mode of excitation requires a high level of attention regarding the package sealing as a minimal leakage would lead to a rapid degradation of sensitivity.

For more than 40 years, it is established that high Q value crystalline quartz with a low level of dislocation represents a perfect choice to eliminate an hysterisis issue on micro-vibrating structures. The behavior of this piezo material is well described in the literature. The electronics associated with such a QMEMS device remains simple which enables the possibility of a compact, low power requirement and a reliable inertial system on a chip. Analog and digital signal outputs are directly retrieved from such QMEMS resonators.

On the inertial sensor market, there is a real need for a compact and affordable sensor on a chip that combines gyroscope and linear accelerometer functions on three axes of rotation and three axes of linear displacement. These two functions are essential for inertial navigation systems for military purposes, active suspension, chassis control and braking systems in automotive, for monitoring during deep wells drilling among other inertial applications. On today's inertial sensor market, such combined functions are mostly realized by the addition of a plurality of single axis sensors, which are gyroscopes and accelerometers, linked to a common electronic platform. That duplication of sensors has an impact on the size and the cost of the inertial sensor solution.

It is well known that most of the manufacturers using inertial sensor systems are looking to merge such independent sensors into a single, more compact and more affordable sensor system. In order to cope with these on-going sensor clusterisation programs, it is the purpose of the present invention to merge three single axis gyro elements and three single axis linear accelerometer elements into one compact single solid state sensor element that could be easily surface mounted on an electronic assembly.

It is also an object of the present invention to propose a combined sensor element that would be resistant to harsh environments from deep wells drilling in the oil industry or under hood conditions in the automotive industry.

It is one of the objectives of the present invention to disclose an integrated sensor element that can be easily manufactured with minimal steps of operation using well known techniques, from affordable materials. With the present invention, it is also possible to adjust frequencies of vibrating forks and beams included in the gyro and accelerometer portions.

Globally, it is an object of this invention to provide the large electronics market with a compact three axis gyroscope sensor combined with a three axis linear accelerometer sensor which can be easily manufactured at low cost offering a tuning possibility as well as analog and digital output from simple drive and sensing electronics while providing long term stability and reliability for harsh environments.

SUMMARY OF THE INVENTION

In one aspect, the monolithic solid-state inertial sensor disclosed herein for detection of rotation rate about three orthogonal axes includes a micromachined monolithic piezoelectric crystalline structure including an equal number of vibratory drive and detection tines on each side of an axis of symmetry of the sensor, the tines being synchronized to have alternative actuation movements inward and outward. In a preferred embodiment, the sensor further includes two pairs of vibratory elements separated by a 60 degrees angle on each side of the axis of symmetry so that each pair of vibratory elements includes one vibrating tuning tine and one detection tine parallel to each other and linked by a common base.

It is preferred that the sensor include a trench in a central portion creating a left and right side supporting the vibratory sensors. This embodiment may include six detection tines coupled at resonance frequency to four parallel drive tines for detection of out-of-plane vibration due to rotation around any axis of rotation. The sensor may undergo a waving effect from left to right when rotated about a Y-axis to create a maximal electrical signal from detection tines on each side of the trench. There may also be a waving effect from front to back when rotated about an X-axis.

In yet another aspect, the invention is a monolithic solid-state inertial sensor having independent gyroscope function on three orthogonal axes of rotation and an accelerometer function on three orthogonal axes of linear displacement. In one embodiment, the accelerometer function is provided by a torsion bar and four vibrating beam accelerometers, each one having an independent proof mass, a connection arm, a pivot point to allow movement of the connection arm along a sensitive axis, and a vibrating beam attached at a selected distance from the pivot point.

In yet another aspect, the piezoelectric sensor includes detection circuitry having six detection tines sensitive to orthogonal vibration modes following an XY plane or YX plane plus electronic circuitry allowing a discrimination of vibration modes along the XY plane or YZ plane and their amplitude which is proportional to the rate of rotation along sensitive axes.

BRIEF DESCRIPTION OF THE DRAWING

FIG. 10 illustrates the behavior of detection tines when rotated around orthogonal axes.

DESCRIPTION OF THE PREFERRED EMBODIMENT

The present invention relates to the juxtaposition of a three axis vibratory gyroscope and a three axis linear accelerometer in a robust solid state design with high degree of freedom and sensitivity that is easily integrated in a single chip element via a compact QMEMS design and simple electronics.

Figure 1:
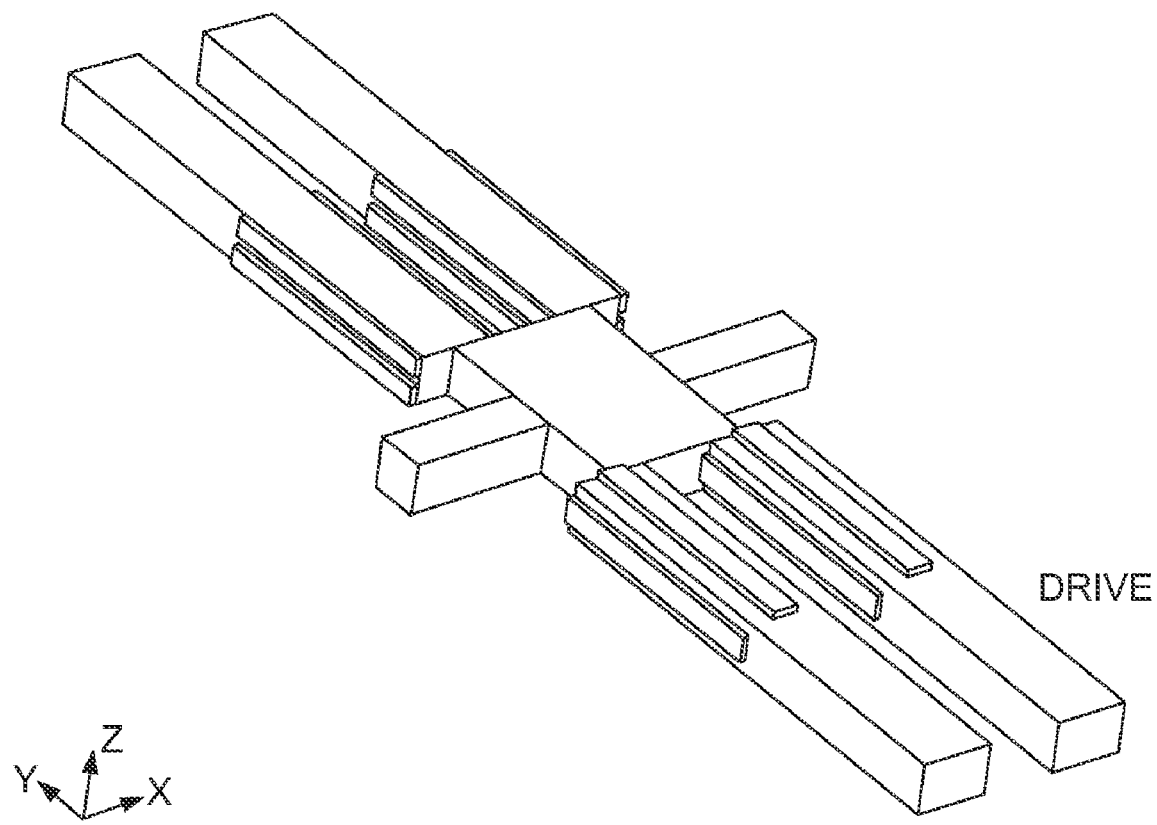
FIG. 1 is a perspective view of a prior art, single axis tuning fork gyroscope.
Figure 2:
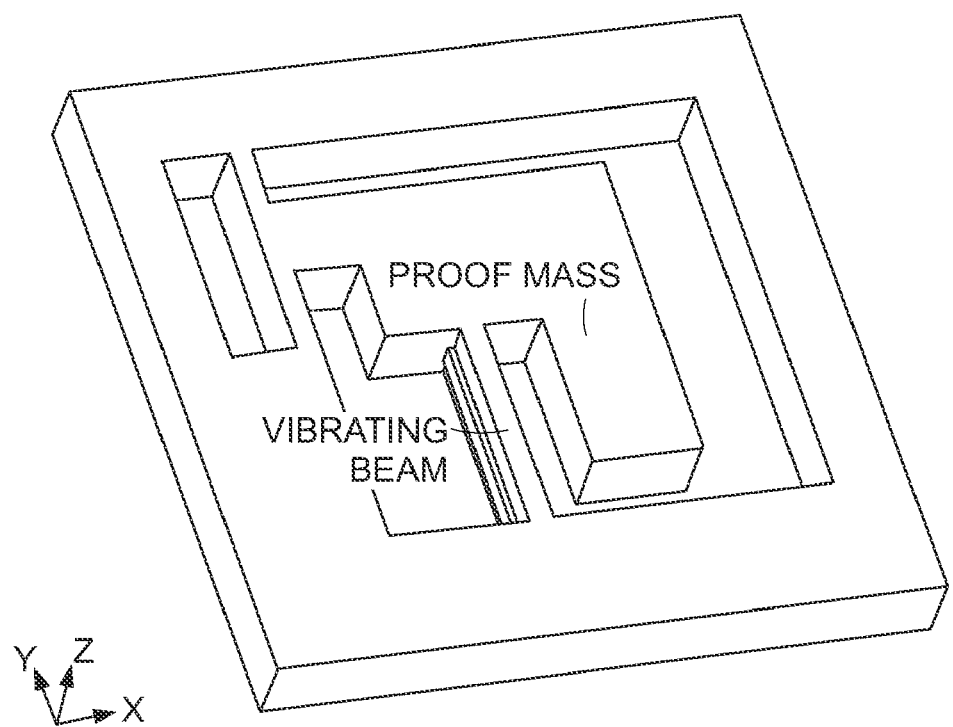
FIG. 2 is a perspective view of a prior art single axis vibrating beam accelerometer (VBA) with independent proof mass.
Figure 3:
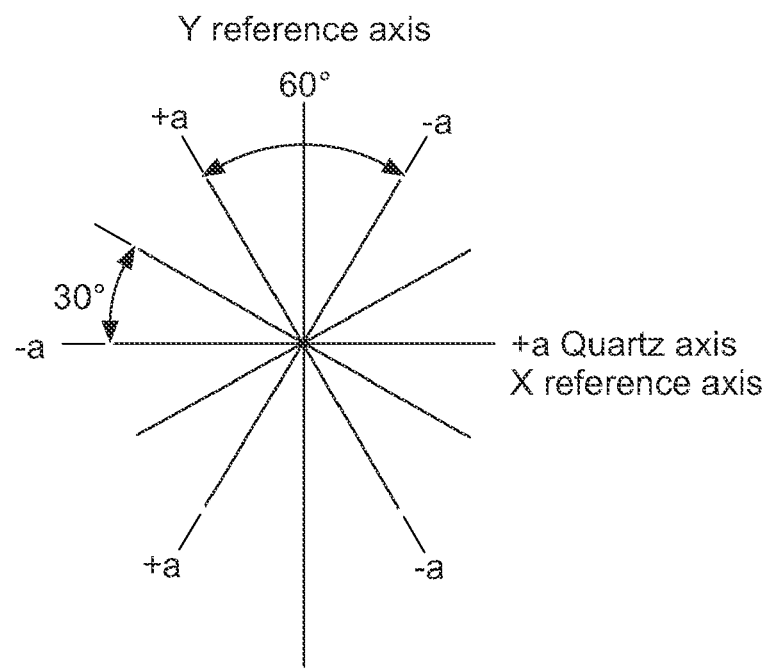
FIG. 3 is an illustration of the reference axis used in the present invention.
Figure 6:
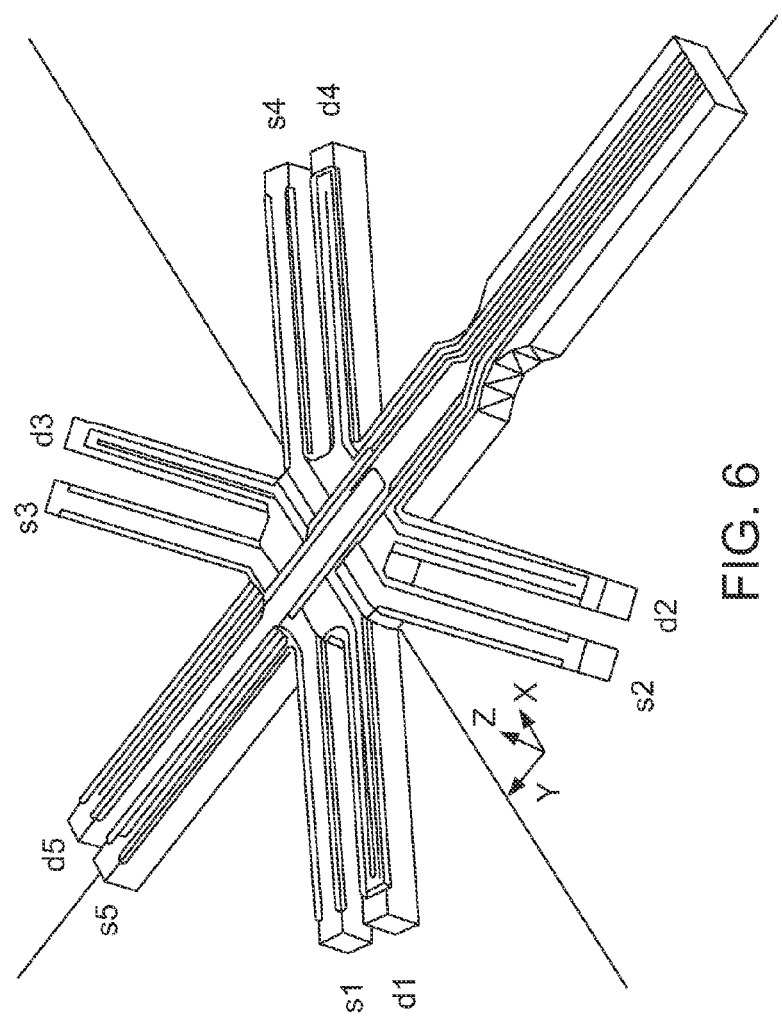
FIG. 6 is an isometric view of the gyroscope disclosed herein along with deposited electrodes.
Figure 5:
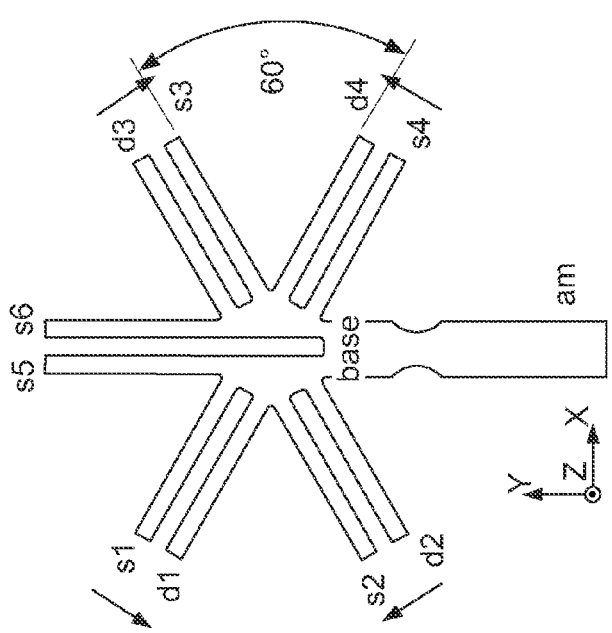
FIG. 5 is a plan view of the gyroscopic sensor disclosed herein.

An innovation of this invention resides in a four wings butterfly gyroscope using four vibrating forks as driving elements to generate large in plane vibration that are symmetrically disposed around rotation axes X and Y. This drive vibratory mode is actuated by the converse piezoelectric effect. Referring to FIGS. 3, 5 and 6, these driving forks are separated by 60 degrees and are substantially perpendicular to two of the electrical axes. They are attached to a common base separated in two portions by a trench parallel to the Y axis allowing more flexibility of the base for the waving effect. A single detection tine is disposed parallel to each drive tine to measure the out of plane vibration generated when the sensor is rotated around an X or Y axis. Two additional detection tines perpendicular to the third electrical axis which is parallel to X are used to measure the in plane vibration generated when the sensor is rotated around the Z axis.

Figure 4:
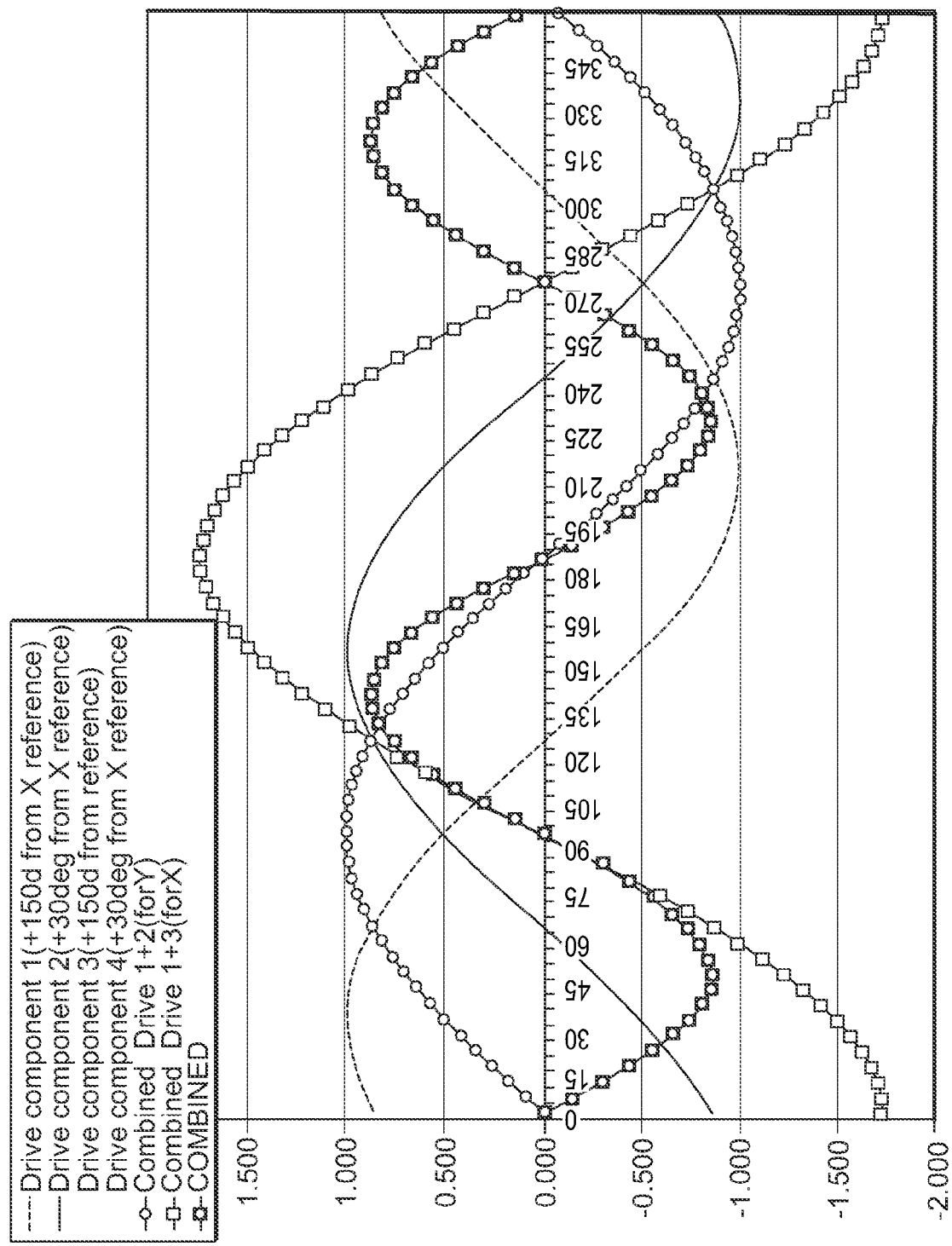
FIG. 4 is a graph showing efficiency of the vibratory drive function disclosed herein to generate out-of-plane vibration for axes of rotation between 0 and 360 degrees.

The gyroscopic sensing function uses the direct piezoelectric effect from linear strains on detection tines created by the Coriolis force generated when the sensor is rotated. The resulting pattern of voltages captured by the sensing electrodes is directly proportional to the rate of rotation around axis of rotation X, Y or Z. As indicated in FIG. 4, due to the direction of the drive actuation, the combined voltage signals captured from group of tines 1-2 and 3-4 are maximal when the sensor is rotated around Y and progressively decreases to 0 when the axis of rotation is progressively changed toward X. Inversely, the combined voltage signals captured from group of tines 1-3 and 2-4 are maximal when the sensor is rotated around X and progressively decrease to a null value when the axis of rotation is progressively changed toward Y.

In the present invention, a three axis accelerometer portion is integrated in such a manner that no electrical interference or mechanical distortion is transmitted to the three axis gyro portion. The accelerometer portion is independent of the gyro portion; the accelerometer portion has no effect on the performance of the gyro portion and inversely.

Figure 7:
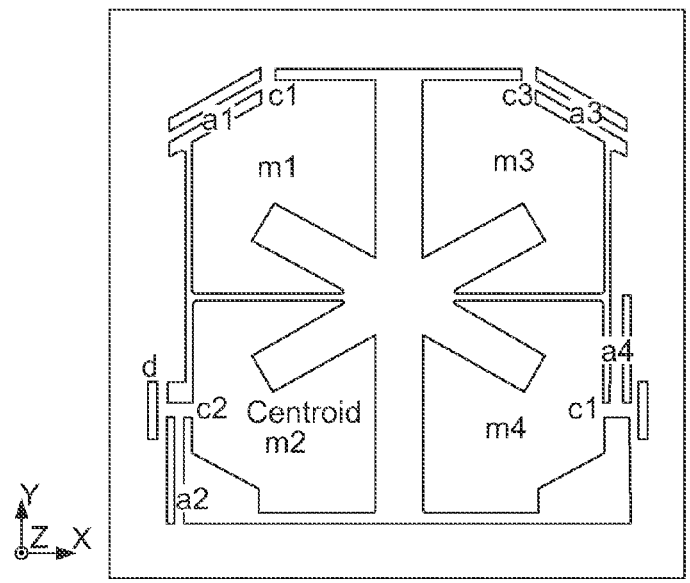
FIG. 7 is a plan view of an embodiment of a vibrating beam accelerometer disclosed herein.

Referring to FIG. 7, the multi-axis accelerometer function is realised by four VBA arrangements, each comprising a vibrating beam, a pivot, a lever arm and a proof mass. Following X and Y axes, the differentiation of frequencies, obtained from opposite VBA arrangements, is proportional to the acceleration along the sensitive axis. The accelerometer function uses an independent torsion beam oriented along one of the electrical axes and connected to the VBA arrangements 1 and 3. The direct piezoelectric effect is obtained from shear strains in this torsion bar when the sensor is accelerated along the Z axis. The resulting induced voltage is directly proportional to the acceleration along this axis.

For the present invention, referring to U.S. Pat. No. 7,126,262 or U.S. Pat. No. 6,414,416, it is generally established that a vibrating forks design results in high Q due to the free ends and low energy loses, if some considerations are taken into account for the support design. In this invention, the in-plane inertial momentum is created with relatively large tuning forks which are coupled to detection tines in a perfect symmetry to maximize the signal/noise ratio.

The piezo-electric properties and crystallography details of quartz material are well described in a vast number of publications for the last 40 years. It is established that a quartz crystal has a hexagonal lattice with a 120 deg symmetry having three electrical axes X (a), as illustrated in FIG. 3. In the same plane, three mechanical axes Y are perpendicular to every electrical axis.

Generally speaking, Hooke's law provides a basic explanation for the relationship between elasticity and deformation. This law establishes a relationship between tension and displacement:

$$S_i = \Sigma(S_{ij} T_j)$$

where i=1 to 6 represents the possible displacements which are either linear displacements parallel to the main axis (j=1, 2, 3) or perpendicular (shear) to the main axis (j=4, 5, 6). Sij represents the elastic coefficients of the body, following each direction.

Similarly, the charge density of a piezoelectric material under constraints is $$Q_i = \sum_{j=1}^{6} (d_{ij}\sigma_j) \quad i = 1, 2, 3 \quad (1)$$

where Q represents the electric charge density in Coulombs, dij represents the piezoelectric coefficients and σ represents the applied force tension. For quartz and other trigonal class 32 piezo material, there are two independent piezoelectric factors organized following this well known matrix:

$$\begin{pmatrix} d_{11} & -d_{11} & 0 & d_{14} & 0 & 0 \\ 0 & 0 & 0 & 0 & -d_{14} & -2d_{11} \\ 0 & 0 & 0 & 0 & 0 & 0 \end{pmatrix} \quad (2)$$

where rows represent a reference axis for the electric field orientation (X, Y, Z) while columns represent the surface orientation and strain direction which are respectively, from left to right, Xx, Yy, Zz, Yz or Zy, Zx or Xz, Xy or Yx. The $d_{11}$ coefficient is established at $2.30 \times 10^{-12}$ m/V (or C/N) and the $d_{14}$ coefficient is established at $0.6 \times 10^{-12}$ m/V.

The complete piezoelectric equation of a piezo sensor is:

$$D = \sum_{j=1}^{6} (d_{ij}\sigma_j) + \sum_{m=1}^{3} (\varepsilon_m E_m)$$

here $\varepsilon_m$ represents the permittivity along X, Y or Z and $E_m$ represents the electric field strength.

For the purpose of this invention, it is important to understand the behavior of the quartz crystal in relation to these piezoelectric coefficients and the induced charges on specific surfaces of the sensor components.

Figure 13A:
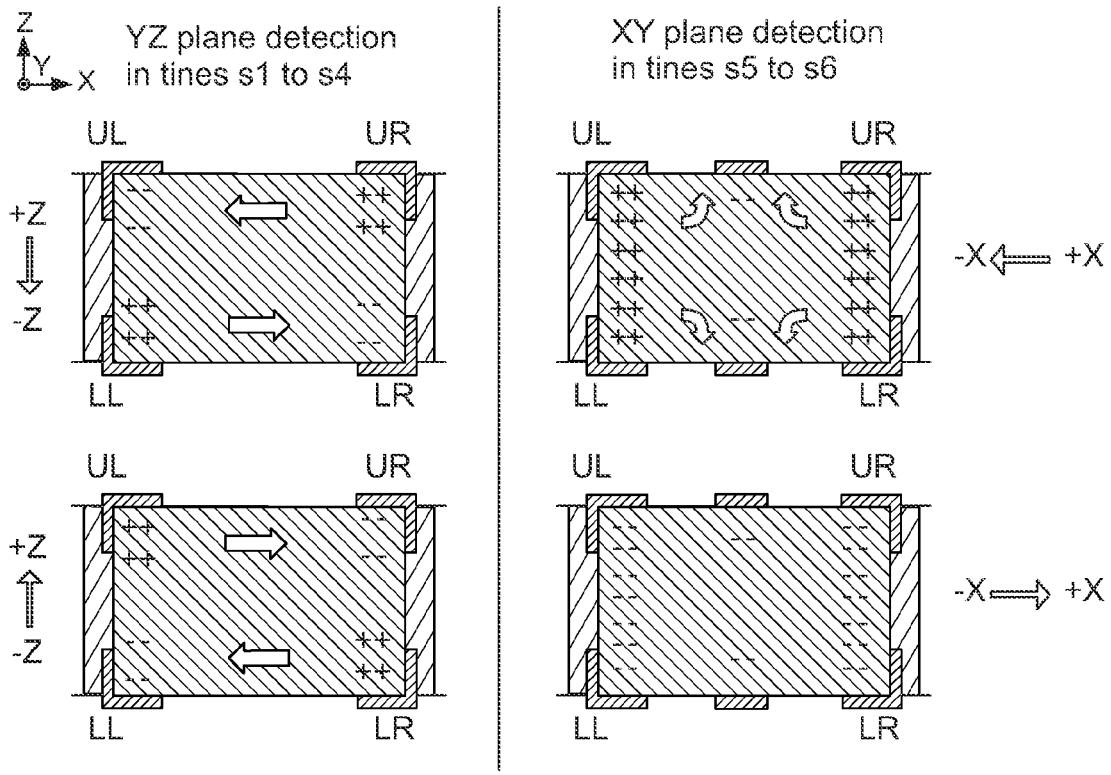
FIG. 13a is a cross-sectional view of the sensor showing the direct piezoelectric effect in the detecting forks of the gyro portion during in-plane and out-of-plane vibration.

The linear piezo coefficients from the first line of the matrix (2) are related to the drive and detection tines of the gyro and accelerometer portions. As illustrated in FIG. 13a, electric charges in the X direction are created when linear strains occur on an X face, in the X direction and, inversely, on a Y face in the Y direction. Also in the X direction and following the right hand rule, smaller electric charges are induced when shear strains occur in the Z direction on a Y face or when shears occur in the Y direction on a Z face.

Figure 13B:
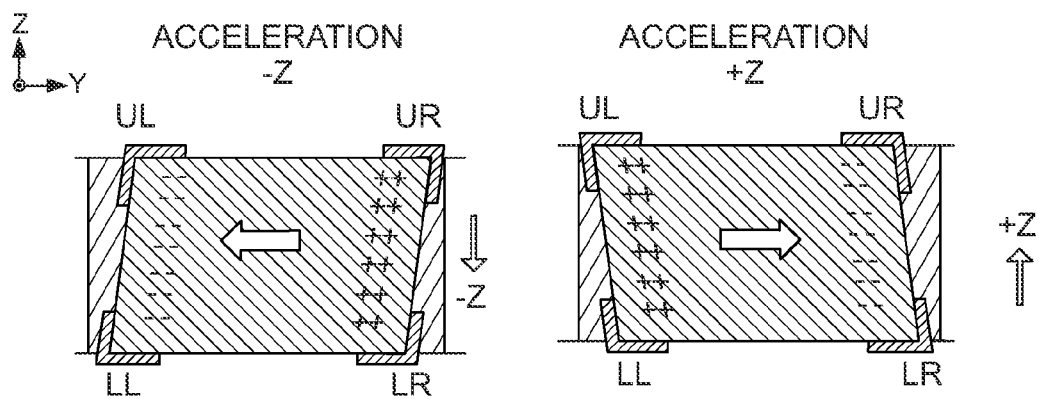
FIG. 13b is a cross-sectional view illustrating the direct piezoelectric effect in a torsion bar of the accelerometer portion.

The shear piezo coefficients from the second line of the matrix (2) are related to the torsion bars of the accelerometer portion. Significant electric charges in the Y direction are induced, following the right hand rule, by shear strains in the X direction on a Y face or by shear strains in the Y direction on an X face, as illustrated in FIG. 13b. Smaller electric charges in the Y direction occur when shear strains occur in the Z direction on an X face or when shears occur in the X direction on a Z face. There is no other possibility of charge polarization following the Y axis which provides a good insulation to mechanical noise due to other vibrating elements from the sensor.

Figure 12:
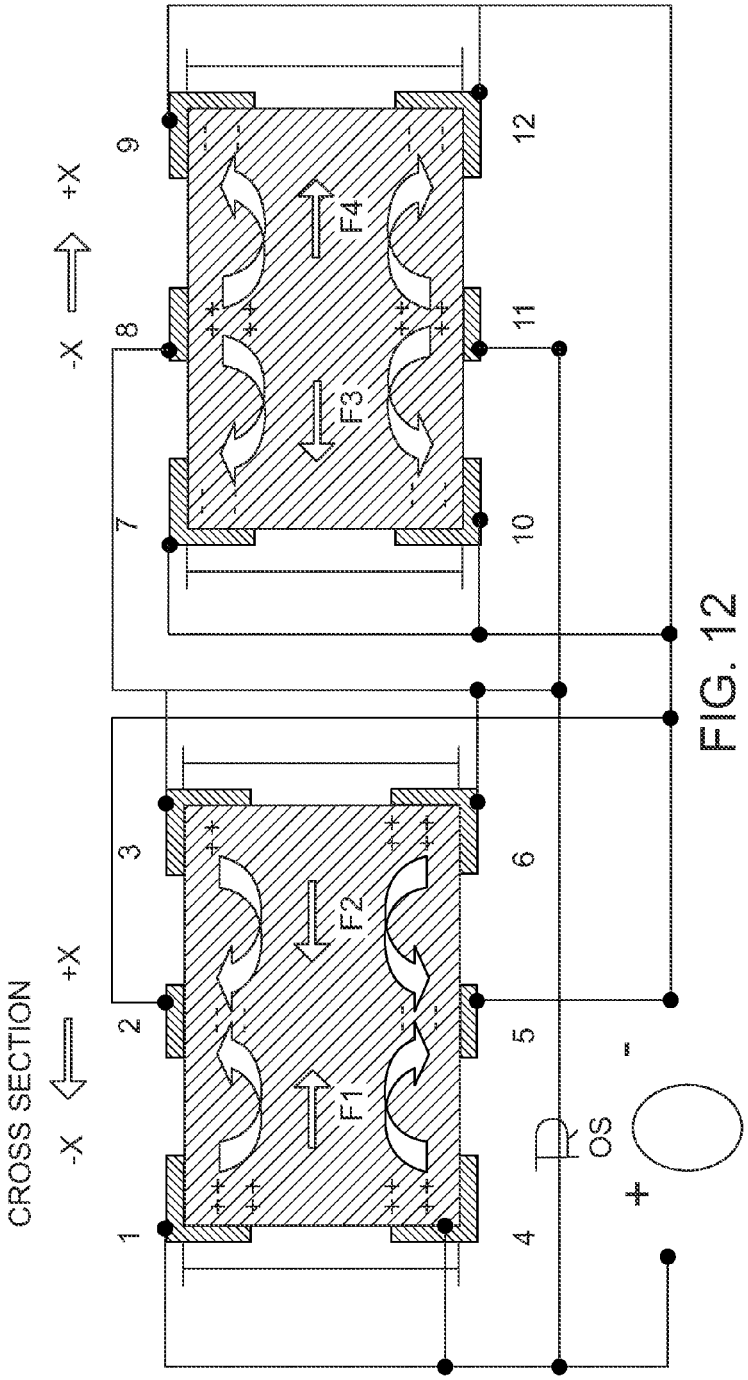
FIG. 12 is a cross-sectional view indicating the converse piezoelectric effect in the driving forks of the gyroscope portion of the sensor.

The drive electrodes illustrated in FIG. 12 are connected to a regular sinusoidal oscillation circuit OS which is not detailed in the present application. The frequency of this oscillation circuit is set to be equal to the natural frequency of the drive tines, which is 28.9 kHz for the preferred embodiment.

From the first two piezo coefficients, $d_{11}$ and $d_{12}$ defined in matrix (2), it is established that an electrical field generated in the quartz crystal in the +X direction will cause a contraction of the quartz crystal in the Y direction. Inversely, an electrical field generated in the −X direction will cause an expansion of the quartz crystal in the Y direction. As explained in U.S. Pat. No. 6,675,651, it is known that, for a similar quartz cut, such compression and expansion occur maximally at the surface around the electrodes area in the X direction.

Referring to FIG. 12 related to the drive circuitry, for the first half sequence of the oscillation circuit, the electrodes 1,3,4,6,8 and 11 are connected to a positive voltage while the electrodes 2,5,7,9,10 and 12 are connected to a negative voltage. This pattern of connections is repeated to the other drive tines arrangement.

Such voltage applied between these electrodes causes a resultant electric field in the +X and −X directions inside the tuning forks, as illustrated by the arrows F1 to F4.

This resultant electric field creates a surface tension variation that causes the forks to bend in the +X or −X direction due to the corresponding elongation or contraction in the Y direction. Inversely, as the piezoelectric effect is reversible, the induced potential is amplified and returned to the driving circuitry.

Referring to the FIG. 13a, which is related to an example of detection circuitry of the gyroscopic function for the detection of in plane and out of plane vibrations, two patterns of charges are illustrated, depending of the induced strains in the detection tine.

When a detecting tine is coupled to an out-of-plane vibration (YZ plane), a voltage proportional to the strain in the Y direction is obtained on the X faces from the piezo coefficient $d_{12}$, defined in matrix (2). When the tine is forced down, a tension in the Y direction is induced at the upper portion (+Z) and a compression is induced at the lower portion (−Z). Consequently, positive charges appear on the −X face of the detection tine at the lower portion level and on the +X face at the upper portion level. When the detecting tine is forced up, the inverse electric pattern is induced on the −X and +X face, creating an inversion of the signal.

Similarly, when a detection tine is coupled to an in-plane vibration (XY plane), a voltage proportional to the strain in the Y direction is obtained on an X face from the same piezo coefficient. When the detection tine is forced in the −X direction, the entire +X face of the detection tine is under tension in the Y direction while the −X face is under compression in the Y direction. Consequently, positive charges, relatively equally distributed, appear on both the X faces of the detection tine. Consecutively, when the detection tine is forced in the +X direction, the entire +X face of the detection tine is under compression in the Y direction while the −X face is under tension in the Y direction. Consequently, no positive charges are generated simultaneously on both X faces of the detection tine.

To pickup the charges accumulated following the out-of-plane vibration (YZ plane) and in-plane vibration (XY plane), electrodes are sputtered onto the surface of the detection tines.

Referring to the FIG. 13b, which is related to the detection circuitry of the accelerometer portion along the Z direction, one torsion bar perpendicular to the Y axis is micro-machined and attached to two proof masses using connection arms. Two patterns of charges are illustrated depending of the direction of the acceleration. When the sensor experiences an acceleration along the +Z direction, electric charges are generated on the Y faces of the torsion beam along the X axis. To pickup these charges on the Y faces of the torsion bars, electrodes are sputtered on the YZ surfaces of the beam t, which is parallel to the X axis.

By definition, the main characteristic of a gyroscopic device is the ability of its rotating or vibrating system to remain in the same plane as it is rotated. Physically, this in-plane inertia when rotated creates an orthogonal force that is proportional to the weight and the vibrating speed of the drive elements as well as the rate of rotation. In this sensor, this resulting force, which is often called Coriolis force, creates a second or a third vibration mode which can be directly measured by sensing elements.

It is demonstrated in the literature that this vectorial force is directly proportional to the rate of rotation and can be described with a simple basic equation. Given that Coriolis acceleration ($a_c$) of a vibrating tine as it rotates is:

$$a_c = -2(\upsilon \times \Omega).$$

where $\upsilon$ represents the vibrating speed of the drive time and $\Omega$ the angular rate of the rotation movement.

The vibrating speed of the drive tine is related to the drive frequency $\omega$. At a given time t, the in-plane position $P_x$ of the vibrating tine is:

$$P_x = A \sin(\omega t)$$

where A represents the amplitude, under the condition of constant resonant frequency which is around 0.5 nm for the present invention. Along the same axis, the speed Vx of the vibrating tine is the derivative of the position:

$$V_x = dP_x/dx \quad (3)$$

$$V_x = A\omega \cos(\omega t)$$

The Coriolis force (vector) applied on each drive tine as it is rotated is $F=ma_c$, where m represents the suspended mass of the vibrating tine arrangement.

Combining both functions, the Coriolis force (vector) on driving forks of the gyro portion when rotated around a corresponding sensitive axis is $$Fc = -2m\Omega A\omega \cos(wt)$$

This force is approximately 100,000 times weaker than the gravitational acceleration.

Using FIGS. 5 and 6 as reference, this invention uses a butterfly arrangement of driving and sensing tuning forks having a 60 degree symmetry, on each side of a central core which is separated by a trench parallel to the Y axis. Incidentally, a total of four tuning forks are present; two on each side of the Y axis. Four detection forks parallel to the four driving tines are attached to the core just beside each of the driving tines. The configuration is symmetrical around X and around Y. This amplitude is adjusted with the drive current to a maximum of 50 nm, depending on the application and the desired range of rotation rate. In this design, it is important to establish the natural resonant frequency $\omega$ of the driving forks arrangement as well as the current generated by the detection forks as a function of the Coriolis force.

Incidentally, the Coriolis force (3) is generated when the vibratory driving forks at resonant frequency are rotated along a sensitive axis. This force is orthogonal to the vibration direction and the rotation axis. This force is transmitted from the base of the drive tines to the detection tines and its action decreases by a factor (L−y) from the base to the end of the detection beam. The tension (or compression) in the y direction along the side of the detection tine is proportional to the amount of electric charges that can be picked up by the electrodes, as explained in the previous section.

From Hooke's spring model, we have a relation between this constant Coriolis force and the associated bending displacement (u).

$$F_c = ku \quad (4)$$

where k represents the spring factor of the tuning fork which is resolved by an Euler-Bernoulli beam equation at equilibrium with a moment $M=F_c(L-y)$, at a distance x from the side of the beam $$\sigma_y = \frac{xF_c(L-y)}{I} = xE\frac{\partial^2 u}{\partial y^2} \quad (5)$$

where E is the Young's modulus for Alpha Quartz (in $N/m^2$): $7.87 \times 10^{10}$ and I is the moment of inertia of the rectangular shaped detection tines, which is $$I = \frac{t^3 w}{12}$$

With successive integration of (5) and terms simplification, we have $$u(y) = \frac{2F_c y^2 (3L-y)}{Ewt^3} \quad (6)$$

From (6), the maximal displacement u, at y=L is retrieved, $$u(L) = \frac{4F_c}{Ew}(L/t)^3 \quad (7)$$

Using (7) in (4), the spring constant of the detection fork, for a maximal displacement is retrieved, $$k = \frac{Ew}{4}(t/L)^3 \quad (8)$$

Using this spring constant, the natural harmonic frequency of the drive and detection forks is retrieved $$\omega = \frac{1}{2\pi}\sqrt{k/m} \quad (9)$$

where m is the mass of the vibrating forks. Using $\rho=2650$ $Kg/m^2$ for the mass density of alpha quartz material, after substitution of (8) in (9) and simplification of the terms, the natural resonant frequency of the driving forks is:

$$\omega = c\frac{t}{2\pi L^2}\sqrt{E/\rho} \quad (10)$$

where c is an adjustment factor for the vibration mode. With the proposed invention, the natural harmonic frequency of the driving forks is set at 28.9 kHz. The harmonic frequency of the detection forks is set to be slightly higher at 30.9 kHz.

Figure 8:
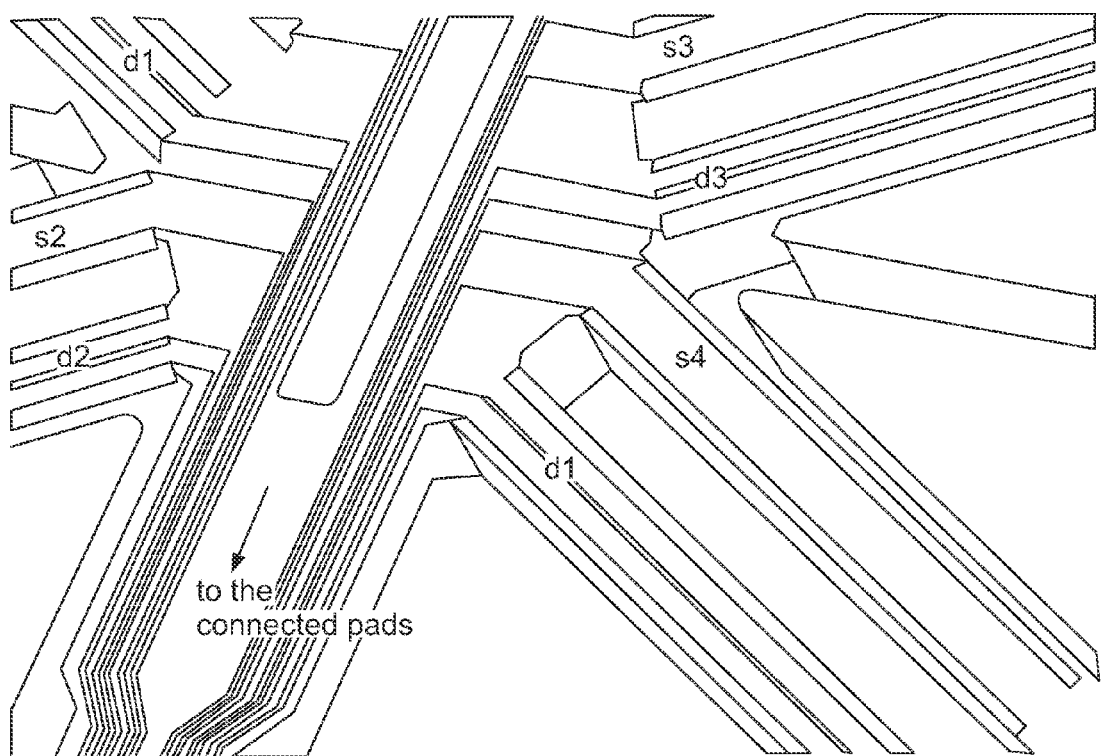
FIG. 8 is a perspective view showing more detail of the electronic circuitry for a gyroscope portion.
Figure 9:
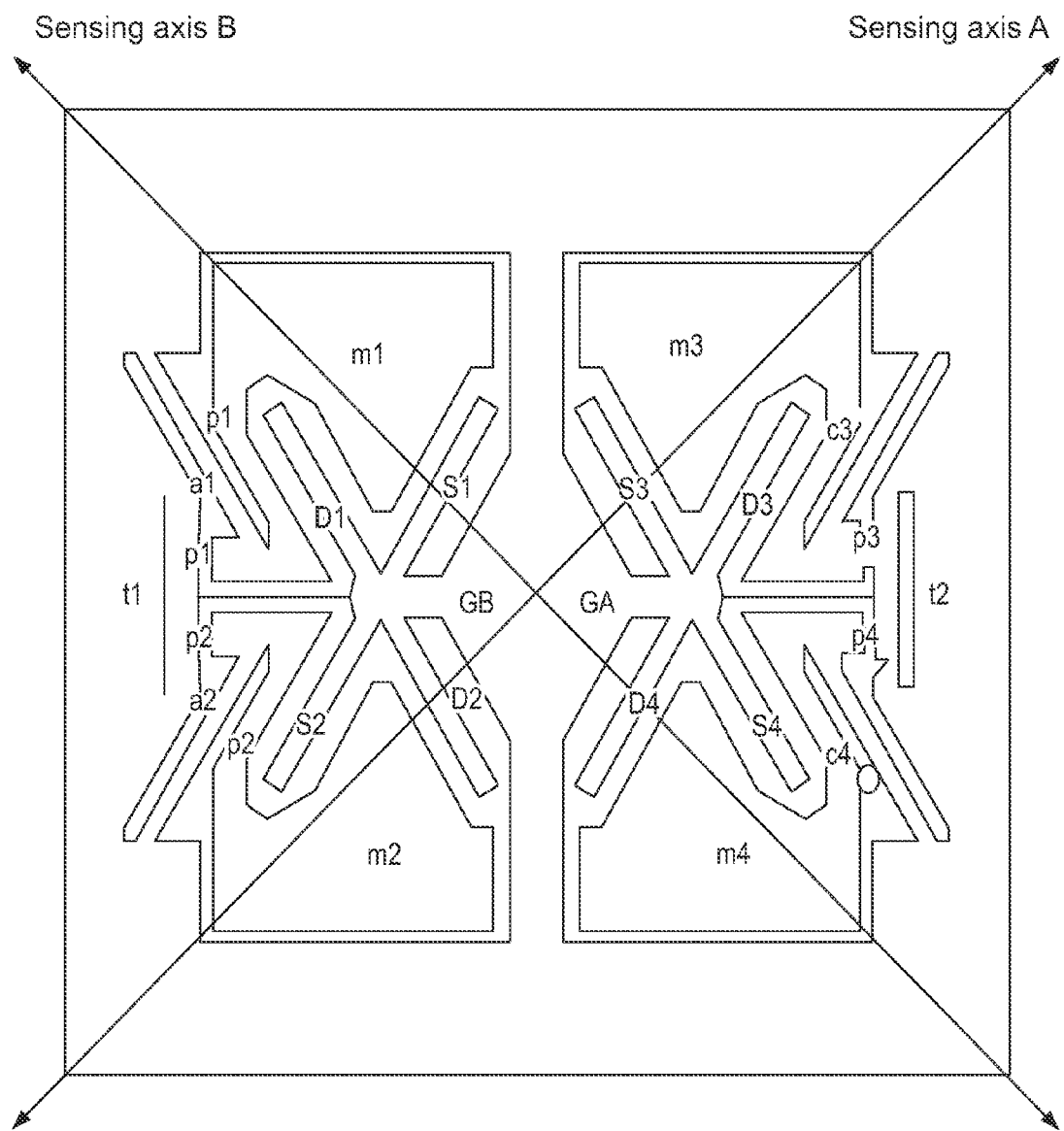
FIG. 9 is a plan view showing a double butterfly arrangement for an embodiment of the invention.

Referring to the proceeding section and FIG. 8, the amount of electric charges that can be picked up by the electrodes on the side of the detection forks is a function of the tension (or compression) stress which is maximal at the YZ surface of the detection tines under deflection in the YZ plane or XY plane due to the Coriolis force. Using the Euler Bernoulli beam equation (5), the charge density (in Coulomb/m$^2$) which is a function of the Coriolis force Fc is $$Q = d_{11}\sigma_y = d_{12}\sigma_y = \frac{12d_{12}F_c(L-y)x}{wt^3}$$

These electric charges are captured by electrodes and are maximal at y=0 and x=t/2, respectively from the base and on the YZ surface (side) of the detection fork. Hence, the total current induced in two detection tines, at every cycle of bending, from y=0 to y=L and from z=−w/2 to w/2, for x=t/2, is $$P(x=t/2,y)=-2K\P f_o d_{12}F_c(L/t)^2 \qquad (11)$$

which reduces to the following (in Coulomb/s=Amp)

$$P(x, y) = 2\left[2\P f \int_{z=-W/2}^{W/2} \int_{y=0}^{y=L} \frac{12d_{12}F_c(L-y)x}{Wt^2} \, dy\, dz \right]$$

where K is a correction factor due to the limited area covered by the electrodes on the side of the detection tines, which decreases the amount of charge collected. This relation is directly proportional to the Coriolis Force which is proportional to the angular rate of rotation (3).

Referring to FIG. 5, the vibratory movement from the driving tines d1, d2, d3 and d4, in the XY plane, creates an orthogonal out-of-plane vibratory mode as the structure is rotated around any axis between 0 to 360 deg in the XY plane. For this invention, these out-of-plane vibrations are called a second vibration mode. This second vibration mode is captured by, electrodes on detection tines s1 to s4 that are coupled to the drive frequency. Incidentally, the induced charges are maximal when these detection tines enter in resonance with the drive tines.

When a rotation occurs around the Z axis, an in-plane vibration perpendicular to the direction of the vibratory drive tines, following the right hand rule of the Coriolis Force, is induced on the structure. This coupled in-plane vibration is called a third vibration mode.

These out-of-plane and in-plane vibrations are induced to the detection tines through the central core of the gyroscope. As the tuning forks arrangements are suspended and because of the proximity of the natural resonance frequency between the drive tines and the corresponding detection tines, the vibration coupling from the base is easy, allowing good sensitivity.

As explained in the preceding section, the rotation rate is directly established by the amplitude measurement of the signal picked up by the electrodes sputtered on the detection tines, which is proportional to the rate of rotation. Also, as illustrated in FIG. 4, the strength of the induced charges is not the same for all detection tines, for a given axis of rotation, due to their respective orientation. The base idea behind this butterfly design is to have a maximal signal from a group of tines when they are rotated around X and a null signal from the same group of tines when they are rotated around Y, and inversely.

As indicated in FIG. 4, due to the direction of the drive actuation, the combined voltage signals captured from the group of tines 1-2 and 3-4 are maximal when the sensor is rotated around Y and progressively decrease to zero when the axis of rotation is progressively changed toward X. Inversely, the combined voltage signals captured from the group of tines 1-3 and 2-4 are maximal when the sensor is rotated around X and progressively decrease to a null value when the axis of rotation is progressively changed toward Y.

As indicated in FIG. 5, all drive tines are vibrating toward the same direction, alternatively inward and outward, in order to create a waving effect in the structure as it is rotated. The resulting movements of the detection tines are described in FIG. 10. Incidentally, when the sensor is rotated around Y, left tines are bending up while the right tines are bending down and inversely creating a waving effect of the structure parallel to the X direction. When the sensor is rotated around X, the tines at the back end, on each side of the sensor, are bending up while the tines at the front end, on the left and right side, are bending down creating a waving effect parallel to the Y direction.

Using FIG. 6, these waving effects are accentuated by the fact that a trench separates the central core of the gyroscope in two portions allowing more flexibility of the structure.

It is clear that the signal to noise ratio is greatly improved as charges from more than one single tine are combined providing a stronger signal when the sensor is rotated.

As illustrated in FIG. 13a, the charges induced at the surface of the detection tines have a different pattern for in-plane and out-of-plane vibration due to the piezo coefficient matrix (2). For out-of-plane vibration, left electrodes (Upper and Lower) and right electrodes (Upper and Lower) have a difference of electric potential due to the polarization at the surface of the YZ face of the detection tines. For in-plane vibration, there is no potential between these electrodes as they are all charged identically.

As indicated in FIG. 10, when the sensor is rotated around Z, the direction of the Coriolis force on the detection tines s1 to s4, following the right hand rule, is parallel to the detection tines. This action pulls the back end of the gyroscope element on one side while the front end is pulled on the other side, parallel to the X axis. This creates a vibration of the structure in the XY plane that is accentuated by the two cut offs operated at the base of the gyro sensor. Detection tines s5 and s6 are attached to the core of the gyro portion, on each side of the central trench, parallel to the Y direction. These two detection tines are perpendicular to the direction of the vibration movement due to a rotation around Z. Hence, the signal from these two tines is maximal when the sensor is rotated around Z.

Figure 14A:
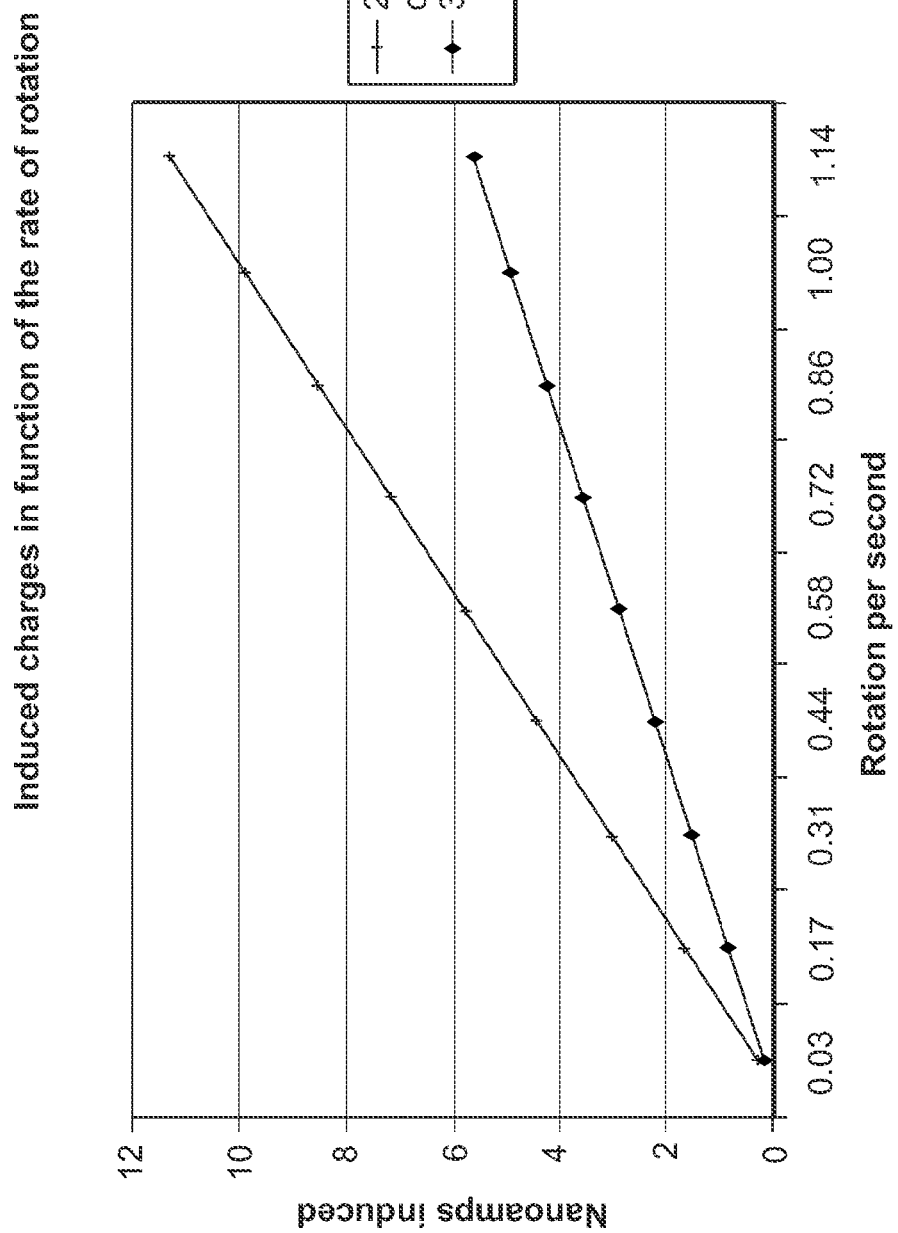
FIG. 14a is a graph showing typical induced charges in detection tines for vibration modes 2 and 3.

For these second and third vibration modes, resulting charges between electrodes on corresponding detection tines are proportional to the rate of rotation around sensitive axes X, Y and Z, as demonstrated in FIG. 14a.

It is one of the goals of the present invention to propose a monolithic solid-state inertial sensor that includes accelerometer function combined with the gyroscopic function described in the preceding section. Four vibrating beam accelerometers are included in this inertial sensor design to measure acceleration in the sensitive axes X, Y and Z. The disposition of the four VBAs is illustrated in FIG. 7.

The accelerometer portion is totally independent from the gyro portion as the multiple vibrating beam accelerometers have no effect on the performance of the gyro portion and inversely. Referring to FIG. 7, each accelerometer includes, for example, a vibrating beam a1, a connection arm c1 attached to the sensor frame by a pivot p1, a proof mass m1 and a torsion beam t.

For this type of sensor, referring to U.S. Pat. No. 6,662,658, U.S. Pat. No. 6,595,054 and U.S. Pat. No. 4,658,175, a common proof mass attached to independent vibrating beams creates noise and perturbation. To avoid these problems, vibrating beams from the accelerometer portion of this invention are attached to independent proof masses.

Figure 11:
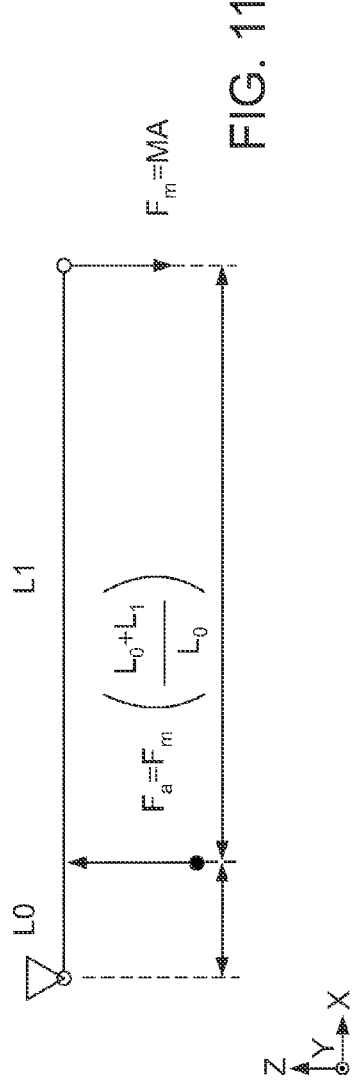
FIG. 11 is a free body diagram for a vibrating beam accelerometer.

The vibrating beam a1, for example, is a simple beam oriented perpendicularly to an electrical axis of the quartz sensor with a natural frequency around 32 kHz. For certain applications, such a simple vibrating beam can be replaced by a double ended tuning fork (DETF) arrangement to decrease the noise transmitted to the structure. Every single or double vibrating beam is piezoelectrically driven to their natural frequency and they are connected via a connection arm to an independent proof mass. As illustrated in FIG. 11, the vibrating beam is at a distance L0 from the pivot point and distance L1 from the inertia center of the proof mass M. Distance L1 is minimally ten times longer than distance L0. Due to this configuration, the connection arm acts as a lever arm of the second type which magnifies the longitudinal tensile or compressive stress on the vibrating beam when the mass m is accelerated along a sensitive axis.

As demonstrated in French patent EP0331557A1, the proof masses supported by independent connection bars are hinged by connection arms which provide mechanical resistance against motion perpendicular to the sensitive axis. Inversely, these connection arms provide much less resistance to motion along the sensitive axis in the XY plane. Incidentally, referring to FIG. 7, every connection arm is aligned with the centroid of the attached proof mass to avoid pressure on the vibrating beam when the acceleration occurs in a direction parallel to the connection arm.

At the back end of the sensor, two connection arms are attached to a torsion beam, which is oriented along the electrical axis X, perpendicular to the mechanical axis Y. Hence, two proof masses provide a torque effect to the torsion bar when the sensor is accelerated along the Z direction. As mentioned in the preceding section, a direct piezoelectric effect is due to this shear force. The orientation of these torsion bars provides natural insulation against noise due to the other tension or compression forces.

For this sensor, the acceleration measurement is performed on the same three sensitive axes used for the gyro portion. Referring to FIG. 7, VBA 1 and 3 are sensitive to acceleration along the axis X. VBA 2 and 4 are sensitive to acceleration along the Y axis. Acceleration along the Z axis is measured by the charges induced in the torsion beam which is stressed by a shear strain from proof mass m1 and m3.

Incidentally, for this invention, the accelerometer function along the sensitive axes X and Y is determined by the frequency changes of two opposite vibrating beam accelerometers.

From the well known Rayleigh equation, it is established that a force $F=m_1 a$ applied on the vibrating beam along its vibrating axes has an influence on its vibrating frequency where m1 is the proof mass and 'a' is the acceleration to be measured. The relation between the acceleration to be measured and the frequency change is as follows:

$$\frac{\nabla f}{f_0} = \frac{f_s - f_0}{f_0} = \frac{kL^2 m_1 a}{Ewt^3} \quad (12)$$

where $f_0$ is the natural frequency of the vibrating beam and k is a constant parameter related to the fixed-fixed boundary conditions of the vibrating beams (k=0.3).

Figure 14B:
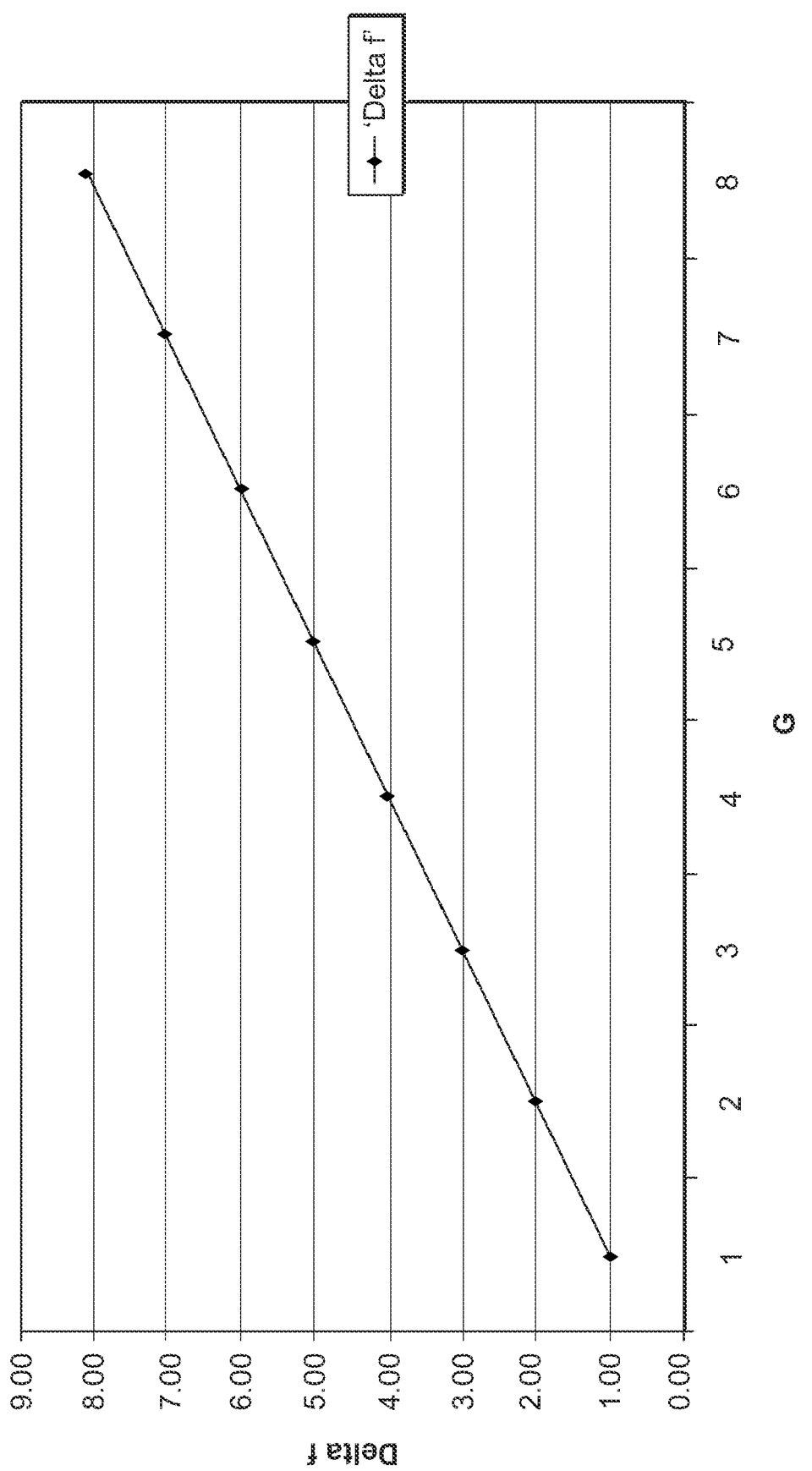
FIG. 14b is a graph illustrating frequency change as a function of acceleration.

The sensitivity per pressure unit applied on the vibrating beam of the present design is around 6 Hz/Pa and the typical frequency changes for various accelerations is illustrated in FIG. 14b. For this sensor, the sensitivity of the acceleration following an axis is due to the relative position of the vibrating beam, the pivot, the lever arm and the proof mass.

In this invention, the accelerometer function uses two identical assemblies arranged so that an input acceleration places one beam in tension and one beam in compression (push-pull). The output signal is then taken as the difference frequency. Because of this, the effects of temperature variation, nonlinearities and aging have no influence on the performance of the accelerometer function.

It is established that the tensile strength of quartz material is approximately established at 50 Mpa which represents the limit of the accelerometer portion at 10,000 G.

For this sensor, it is easy to remove either the gyroscope or the accelerometer portion to satisfy various requirements. The size of the sensor can be decreased accordingly.

This combined three axis inertial sensor is preferably made from Z-cut wafer with a rotation of 2 deg to 5 deg around the X axis, made of high quality, low etch channel density and low inclusion density piezoelectric quartz material. It is established from prior art that such cut improves quartz crystal stability of the resonant frequency over a wide range of temperatures. Ideally, the present invention is chemically manufactured from 75 mm or 100 mm pure crystalline quartz wafers. Such material is suitable because of its excellent mechanical properties which eliminate the risk of hysterisis that has an affect on the stability of the scale factor. Also, the effect of time on the piezoelectric properties of this material is negligible. It is also possible to use other trigonal class 32 material such as gallium phosphate which has the same form of piezoelectric constant matrix, with different values however.

Figure 15:
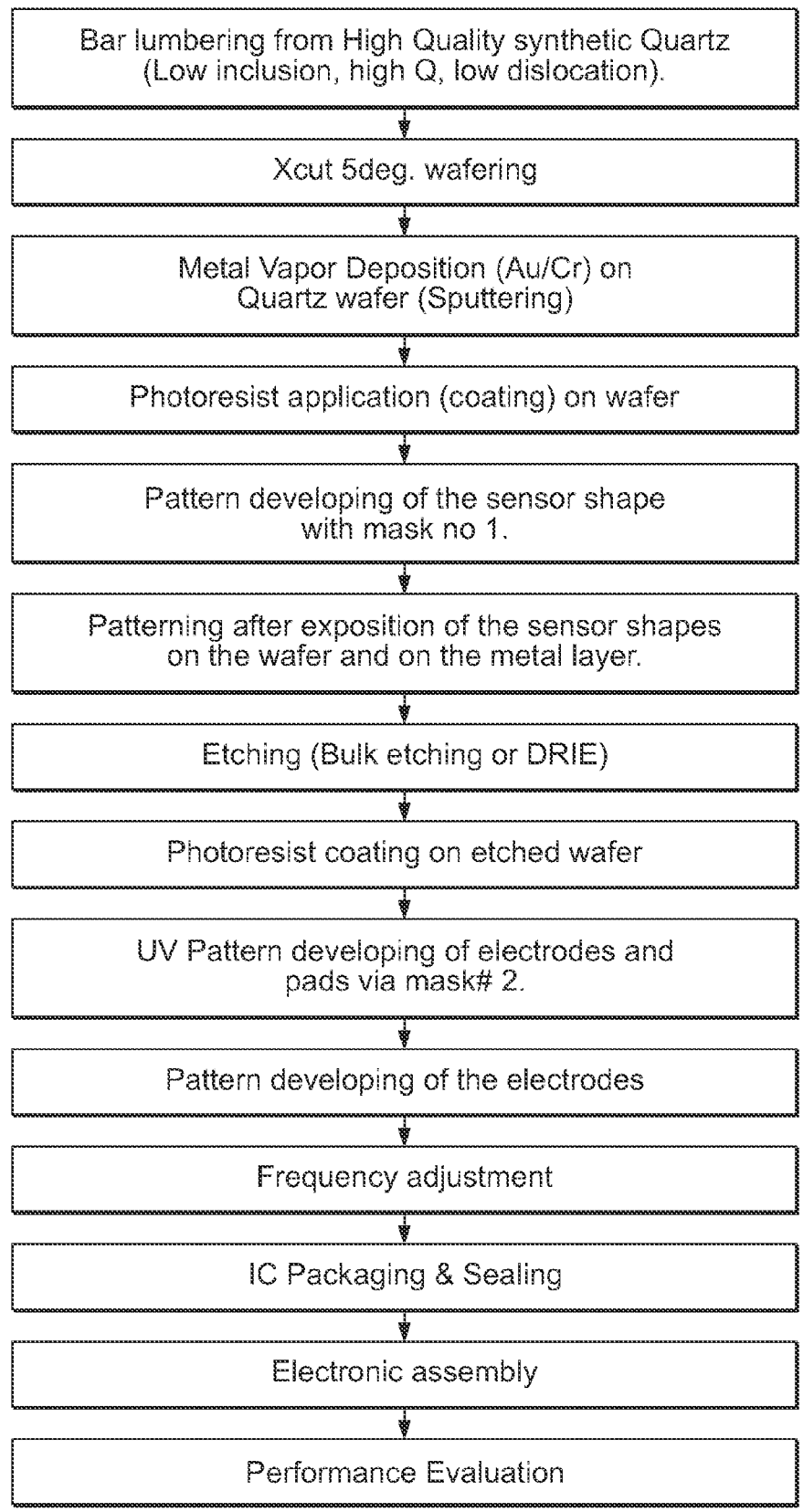
FIG. 15 is a flow diagram illustrating an embodiment of a manufacturing process for making the inertial sensor disclosed herein.

Referring to FIG. 15, this sensor is primarily machined by a common chemical etching technique known from precedent art. In order to maintain high manufacturing efficiencies and maintain low risk of rejection due to flaws or dimensional issues, a deep reactive ion etching technique (DRIE) can be used. A standard wet etching process using ammonium bifluoride solution at standard concentration and temperature can be used to increase the etching rapidity but with more dimensional variability. Incidentally, to satisfy one of the main objectives of the present invention, all vibrating beams and forks are disposed in such manner to ease the chemical manufacturing. Cavities and cut-outs are large enough to avoid undesirable residues or shape from the etching process. Critical dimensions to ensure an adequate performance of the sensor are limited to the dimensions (length and thickness) of the vibrating elements. All other dimensions have larger tolerances in all directions. Plating of electrodes is made from a well known technique, from the successive layer deposition of chromium and pure gold.

Respectively for each vibratory drive tines arrangement of the gyro portion, the drive and detection electrodes are routed in parallel orientation on the base. Connections are made from largely separated connection pads disposed on one side of the sensor to avoid an electric short circuit. Drive electrodes of the accelerometer are routed on the other side of the sensor to large connection pads which are also largely separated. Connections to the electronic circuitries can be made either by soldering or by contact.

To satisfy one of the main objectives of the present invention, as per demonstrated in U.S. Pat. No. 6,698,292, the drive and detection elements of the gyroscopic portion of the preferred embodiment are manufactured following strict ratios of width and thickness. Such control is important to decrease the influence of the operating temperature on the general performance of the gyro function. It is one of the preoccupations of the present invention to satisfy a large range of temperature during operation.

Hence, all vibrating elements in this sensor design have a ratio Width/Thickness to be between 0.5 to 1.5.

The contents of all the patents and references mentioned herein are incorporated by reference in their entirety.

What is claimed is:

1. A microelectromechanical inertial sensor comprising:
   a monolithic planar structure having a left side, right side, front portion and rear portion; and
   plural piezoelectric vibrating drive and detection tines oriented in the plane of the planar structure to detect a rotation rate of the inertial sensor about any of three orthogonal axes.

2. The apparatus of claim 1, wherein the plural piezoelectric vibrating drive and detection tines are disposed on the structure such that the left side is substantially symmetric with the right side; and
   the drive tines are synchronized to have alternative actuation movements inward and outward symmetrically from left side to right side and front to back.

3. The apparatus of claim 1, wherein at least one of the plural detection tines and at least one of the plural drive tines are configured to have different natural frequencies.

4. The apparatus of claim 1, wherein the planar structure is formed from a single piece of piezoelectric material.

5. The apparatus of claim 4, wherein the piezoelectric material is of class 32.

6. The apparatus of claim 4, wherein the piezoelectric material is crystalline quartz or gallium phosphate.

7. The apparatus of claim 4, wherein the drive and detection tines are substantially perpendicular to plural electrical axes of the piezoelectric material.

8. The apparatus of claim 1, wherein two pairs of vibrating drive and detection tines are separated by approximately 60 degrees on the left side and two pairs of vibrating drive and detection tines are separated by approximately 60 degrees on the right side of the inertial sensor.

9. The apparatus of claim 8, wherein each pair of vibrating drive and detection tines comprises:
   a vibrating drive tine substantially parallel to a detection tine linked by a common base; and
   electrodes disposed on plural surfaces of the drive and detection tines.

10. The apparatus of claim 1, wherein the sensor includes a trench in a central portion partially separating the left side and right side.

11. The apparatus of claim 1 comprising:
    four detection tines coupled to four substantially parallel drive tines for detecting out-of-plane vibration due to rotation around any axis lying in the plane of the monolithic structure; and
    electrodes disposed on plural surfaces of the drive and detection tines.

12. The apparatus of claim 11, wherein
    a first combined signal from a first pair of detection tines on one side of an X axis reaches a first maximum value for rotation of the inertial sensor about the X axis; and
    a second combined signal from a second pair of detection tines on one side of an orthogonal Y axis reaches a second maximum value for rotation of the inertial sensor about the Y axis.

13. The apparatus of claim 12, wherein an amplitude of the first combined signal and an amplitude of the second combined signal are proportional to the rate of rotation of the inertial sensor.

14. The apparatus of claim 12, wherein the first combined signal and second combined signal provide information about an orientation of the axis of rotation of the inertial sensor in the XY plane.

15. The apparatus of claim 11 further comprising a connection arm extending from the rear portion for connecting the inertial sensor to a frame and wherein the four coupled detection and drive tines are disposed in a butterfly configuration.

16. The apparatus of claim 1 comprising:
    two substantially parallel detection tines for detecting in-plane vibration due to rotation around a Z axis perpendicular to the plane of the monolithic structure; and
    electrodes disposed on plural surfaces of the parallel detection tines.

17. The apparatus of claim 16, wherein the two substantially parallel detection tines produce an electrical signal with an amplitude proportional to the rate of rotation around the Z axis.

18. The apparatus of claim 1 further comprising a torsion bar and plural vibrating beam accelerometers integrated with the monolithic structure, wherein
    the torsion bar and plural vibrating beam accelerometers detect acceleration along any of the three orthogonal axes.

19. The apparatus of claim 18, wherein the torsion bar and plural vibrating beam accelerometers are integrated in such a manner that substantially no electrical interference or mechanical distortion is transmitted to the plural piezoelectric vibrating drive and detection tines.

20. The apparatus of claim 18, wherein each vibrating beam accelerometer comprises:
    an independent proof mass;
    a connection arm;
    a pivot point to allow movement of the connection arm along a sensitive axis; and
    a vibrating beam.

21. The apparatus of claim 20, wherein the connection arm in conjunction with the independent proof mass acts as a lever arm of the second type on the vibrating beam when accelerated along a sensitive axis.

22. The apparatus of claim 18, wherein the plural vibrating beam accelerometers are disposed in a push-pull configuration with independent proof masses in the plane (XY) of the planar structure, and the torsion bar accelerometer detects acceleration in the Z direction.

23. A microelectromechanical inertial sensor comprising:
    a monolithic planar structure;
    plural piezoelectric tines extending in the plane of the structure in plural angular directions from a central core of the planar structure, wherein a first portion of the piezoelectric tines vibrate in the plane of the structure and a second portion of the piezoelectric tines detect a rotation rate of the inertial sensor about any of three orthogonal axes.

24. A method for detecting rotation comprising:
    receiving, by a processor, plural electrical signals from plural piezoelectric detection tines of a monolithic planar microelectromechanical inertial sensor, the inertial sensor having the plural detection tines extending in the plane of the structure in plural angular directions from a central core of the planar structure; and
    determining, by the processor, a rotation rate and direction of rotation of the inertial sensor about any of three orthogonal axes from at least two of the received electrical signals.

* * * * *